(12) United States Patent
Sakata

(10) Patent No.: US 7,815,324 B2
(45) Date of Patent: Oct. 19, 2010

(54) OUTSIDE MIRROR APPARATUS FOR VEHICLE

(75) Inventor: Ikuo Sakata, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 14 days.

(21) Appl. No.: 12/236,820

(22) Filed: Sep. 24, 2008

(65) Prior Publication Data

US 2009/0086351 A1 Apr. 2, 2009

(30) Foreign Application Priority Data

Sep. 27, 2007 (JP) .............................. 2007-251171

(51) Int. Cl.
- *G02B 7/182* (2006.01)
- *B60R 1/06* (2006.01)
- *B60R 1/076* (2006.01)

(52) U.S. Cl. ..................... 359/841; 359/872; 248/478
(58) Field of Classification Search ................ 359/841, 359/872, 877; 248/477, 478, 479
See application file for complete search history.

(56) References Cited

U.S. PATENT DOCUMENTS

| | | | | |
|---|---|---|---|---|
| 5,190,499 A | * | 3/1993 | Mori et al. ................ 464/36 |
| 6,130,514 A | * | 10/2000 | Oesterholt et al. ........... 318/438 |
| 6,793,358 B2 | * | 9/2004 | Sakata .................... 359/872 |
| 6,877,867 B1 | * | 4/2005 | Murakami ................. 359/841 |
| 6,880,940 B1 | * | 4/2005 | Binfet .................... 359/841 |
| 6,979,091 B2 | * | 12/2005 | Ichikawa ................. 359/872 |
| 7,008,067 B2 | * | 3/2006 | Hsu ..................... 359/841 |
| 7,137,715 B2 | * | 11/2006 | Schuurmans et al. ........ 359/841 |
| 7,298,061 B2 | * | 11/2007 | Kyoden .................. 310/68 R |
| 7,393,111 B2 | | 7/2008 | Fuchs et al. |
| 7,490,945 B2 | * | 2/2009 | Proctor .................. 359/841 |
| 7,490,946 B1 | * | 2/2009 | Foote et al. .............. 359/841 |
| 7,546,997 B2 | * | 6/2009 | Van Stiphout ............. 248/477 |
| 2005/0168855 A1 | | 8/2005 | Fanelli et al. |
| 2006/0285236 A1 | | 12/2006 | Huprikar et al. |

FOREIGN PATENT DOCUMENTS

| | | |
|---|---|---|
| EP | 1 170 175 A2 | 1/2002 |
| EP | 1 373 019 B1 | 11/2006 |
| EP | 1 795 394 A1 | 6/2007 |
| FR | 2 845 052 A1 | 4/2004 |
| JP | 2004-58944 A | 2/2004 |
| JP | 2007-38898 A | 2/2007 |
| WO | WO 2005/079535 A2 | 9/2005 |

* cited by examiner

*Primary Examiner*—Ricky D Shafer
(74) *Attorney, Agent, or Firm*—Foley & Lardner LLP

(57) ABSTRACT

A mirror assembly is inclinably mounted on a resin shaft via a spring and a resin stopper.

7 Claims, 13 Drawing Sheets

OUTSIDE MIRROR APPARATUS FOR VEHICLE

BACKGROUND OF THE INVENTION

1. Field of the Invention

The present invention relates to an outside mirror apparatus for a vehicle.

2. Description of the Related Art

There have been known outside mirror apparatuses for a vehicle, such as door mirrors, including a mirror assembly that is inclinable (rotatable) with respect to a vehicle body (e.g., door, fender, or pillar). Examples of such conventional outside mirror apparatuses are disclosed in Japanese Patent Applications Laid-open No. 2007-38898 and No. 2004-58944. The following describes the conventional outside mirror apparatuses for a vehicle.

The former conventional outside mirror apparatus for a vehicle is a door mirror that is rotatably mounted on a resin shaft via a metal spring stopper and a coil spring. In this outside mirror apparatus, the door mirror rotates manually or electrically about the shaft between a use position and a retracted position. Upon application of a load to the door mirror in the use position, the door mirror rotates about the shaft, which causes a buffering effect.

The latter conventional outside mirror apparatus for a vehicle is assembled such that a door mirror visor is rotatably fitted to a shaft tube made of resin via a compression coil spring and a lock washer. In this outside mirror apparatus, the door mirror visor rotates manually or electrically about the shaft tube between a use position and a retracted position. Upon application of a load to the door mirror visor in the use position, the door mirror visor rotates about the shaft tube, which causes a buffering effect.

In the former conventional outside mirror apparatus for a vehicle, however, when the door mirror is rotatably mounted on the resin shaft via the metal spring stopper and the coil spring, i.e., when the metal spring stopper is mounted on the resin shaft, the resin shaft may be scraped by the metal spring stopper. If the resin shaft is scraped, the door mirror may not be securely mounted on the resin shaft. For this reason, the metal spring stopper needs to be prevented from scraping the resin shaft when mounted on the resin shaft.

In the latter conventional outside mirror apparatus for a vehicle, when the door mirror visor is rotatably mounted on the shaft tube made of resin via the metal lock washer and the compression coil spring, i.e., when the metal lock washer is mounted on the shaft tube made of resin, the shaft tube may be scraped by the metal lock washer. If the shaft tube is scraped, the door mirror visor may not be securely mounted on the shaft tube made. For this reason, the metal lock washer needs to be prevented from scraping the shaft tube when mounted on the shaft tube.

SUMMARY OF THE INVENTION

It is an object of the present invention to at least partially solve the problems in the conventional technology.

According to an aspect of the present invention, there is provided an outside mirror apparatus for a vehicle including a mirror assembly that is inclinable with respect to a vehicle body. The outside mirror apparatus includes: a base that is fixed to the vehicle body; a shaft that is made of resin and fixed to the base; a stopper that is made of resin and fixed to the shaft; a spring that is arranged around the shaft while compressed by the stopper; and the mirror assembly that is inclinably mounted on the shaft via the spring and the stopper.

The shaft includes a contacting portion on one end having an engaging portion on an opposite side of the one end of the shaft. The stopper includes a ring-shaped main body having a first end from which the shaft is inserted; a spring contacting portion located on the first end of the main body and brought into contact with the spring; and a plurality of engaging nails arranged along an inner peripheral surface of the first end of the main body and elastically engaged with the engaging portion. The main body is formed of an elastic member that is elastically deformed when the shaft is inserted in the main body from the first end and each of the engaging nails is brought into contact with the contacting portion, and that elastically returns to an original shape when each of the engaging nails reaches the engaging portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
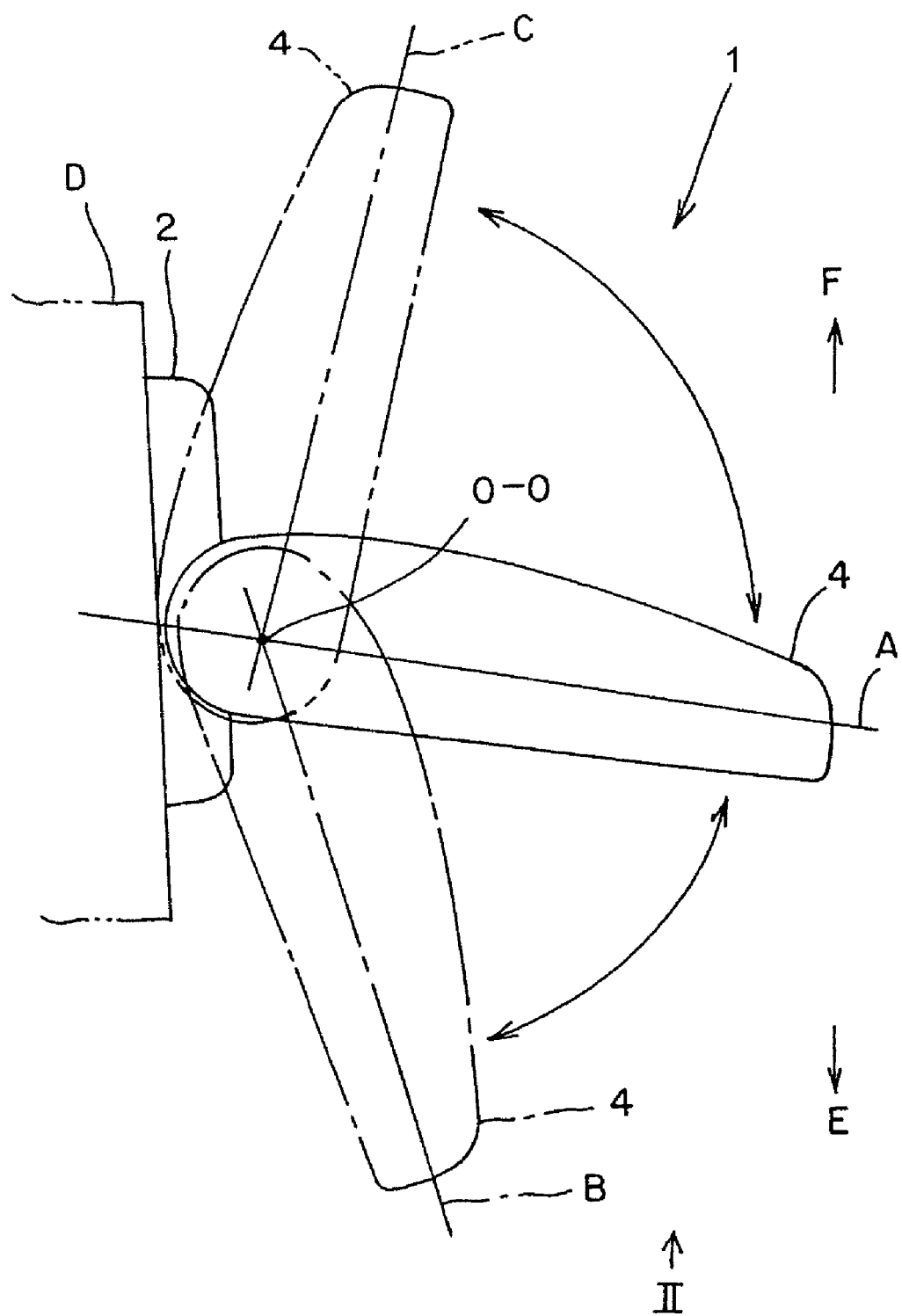
FIG. 1 is a plan view of a door mirror as an outside mirror apparatus for a vehicle in a use position according to a first embodiment of the present invention.
Figure 2:
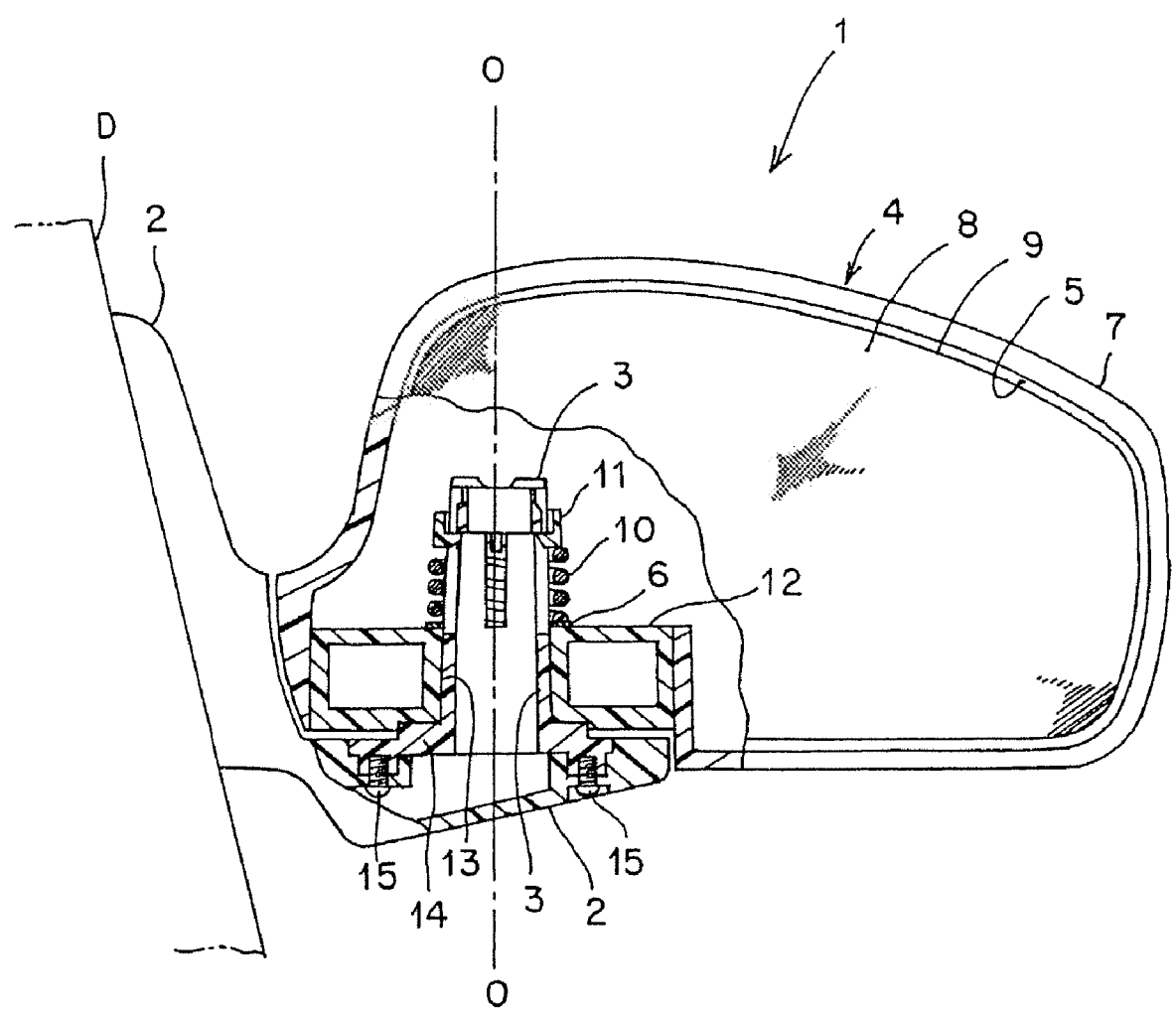
FIG. 2 is a partially cutaway front view of the door mirror viewed from an arrow II in FIG. 1.

FIGS. 1 to 12 are schematic diagrams of an outside mirror apparatus for a vehicle according to a first embodiment of the present invention. In this embodiment, an outside mirror apparatus for a vehicle is described as a door mirror for an automobile (passenger automobile). A door mirror 1 is mounted on doors D on the left and right of the automobile (not shown). The left and right door mirrors 1 are substantially the same but symmetrical in structure (left-right reversed in arrangement), and therefore, one of them, the right door mirror 1, is described in detail. In FIG. 1, the rear of the vehicle is indicated by reference letter E, while the front of the vehicle is indicated by reference letter F.

According to the first embodiment, the door mirror 1 includes a base 2, a resin shaft 3, and a mirror assembly 4. The base 2 is fixed to the door D, and the resin shaft 3 is fixed to the base 2. The mirror assembly 4 is mounted on the shaft 3 via a spring 10, a resin stopper (i.e., push nut) 11, and a washer 6 in an inclinable (rotatable) manner.

The mirror assembly 4 includes a mirror housing 7, and a mirror unit (i.e., mirror) 9 having a reflecting surface 8. One side of the mirror housing 7 is opened, and the other is closed. The mirror unit 9 is provided to an opening 5 of the mirror housing 7. The mirror unit 9 is attached to the mirror housing 7 such that the reflecting surface 8 can be angularly adjusted, through a remote control unit or a power unit (not shown), in the horizontal direction about a substantially vertical axis and in the up-and-down direction about a substantially horizontal axis.

The mirror housing 7 has an attachment member 12. The attachment member 12 is attached to the shaft 3 via the spring 10, the resin stopper 11, and the washer 6 to be inclinable relative to the shaft 3. The attachment member 12 is formed of a frame or a bracket provided separately from the mirror housing 7, and is integrally fixed to the mirror housing 7. The attachment member 12 has an insertion hole 13 in which the shaft 3 is rotatably inserted.

On a bottom end (second end) of the resin shaft 3, a shaft holder 14 is integrally provided. The shaft holder 14 is fixed to the base 2 with screws 15. In this way, the resin shaft 3 is fixed to the base 2.

On a surface (upper surface) of the shaft holder 14 and a surface (lower surface) of the attachment member 12 is provided a positioning member. The positioning member positions the mirror assembly 4 in a use position A (a position indicated by a solid line in FIG. 1) and in a retracted position B (a position indicated by a chain line in FIG. 1). The positioning member includes outside faces of one notch-like projection (not shown, see a portion designated by reference numeral 29 in FIG. 15) and inside faces of two notch-like recessed portions 16 (see FIG. 3). The one projection is provided on the surface of the attachment member 12, and the two recessed portions 16, i.e., the recessed portion 16 for the use position A and the recessed portion 16 for the retracted position B, are provided on the surface of the shaft holder 14. The projection is fitted in either the recessed portion 16 for the use position A or the recessed portion 16 for the retracted position B, so that the mirror assembly 4 is positioned in either the use position A or the retracted position B. Alternatively, two recessed portions may be provided on the surface of the shaft holder 14, and one projection may be provided on the surface of the attachment member 12. The positioning member may include one recessed portion and two projections.

On the surface (upper surface) of the shaft holder 14 and the surface (lower surface) of the attachment member 12 is also provided a stopper. The stopper prevents the mirror assembly 4 from hitting the door D when the mirror assembly 4 is in the retracted position B or in a forward-inclined position C (a position indicated by a chain double-dashed line in FIG. 1). The stopper includes outside faces of a stopper projection 26 (see FIG. 3) and inside faces of a recessed portion or a groove (not shown). The stopper projection 26 is provided on the surface of the shaft holder 14, and the recessed portion or the groove is provided on the surface of the attachment member 12. The stopper projection 26 is fitted in the recessed portion or the groove. The mirror assembly 4 rotates about a rotation center O-O of the shaft 3, and reaches a position immediately before hitting the door D, i.e., the retracted position B or the forward-inclined position C. Accordingly, an edge face of the stopper projection 26 is brought into contact with an edge face of the recessed portion or the groove, so that the mirror assembly 4 is prevented from hitting the door D. Alternatively, a recessed portion or a groove may be provided on the surface of the shaft holder 14, and a stopper projection may be provided on the surface of the attachment member 12. The stopper projection 26 is fitted in the recessed portion or the groove, so that the mirror assembly 4 is guided to rotate about the rotation center O-O of the shaft 3.

The resin shaft 3 is tapered such that the external diameter thereof gradually increases from its top end (one end) to its bottom end. This allows the resin shaft 3 to be easily removed from an injection mold. As shown in FIGS. 3, 6, 8, 10, and 12, the resin shaft 3 has a plurality of grooves 17 (four in this embodiment) extending from the top to the middle thereof at equal intervals. To top portions of the respective four grooves 17 (i.e., to the top end of the shaft 3) are provided contacting portions 24. With the contacting portions 24, the top portions of the grooves 17 form a joint (or a bridge). On the other hand, in portions other than the top portions of the four grooves 17 (i.e., in portions other than the contacting portions 24) are provided penetration portions 25. With the penetration portions 25, the portions other than the top portions of the grooves 17 have penetration configurations. In stepped portions at interfaces between the contacting portions 24 and the penetration portions 25 are respectively provided engaging portions 18. Specifically, the engaging portions 18 are respectively provided at lower surfaces of the contacting portions 24, opposite the top end (first end) of the shaft 3. Further, engaging portions 19 are respectively provided on both side surfaces of the penetration portions 25 of the four grooves 17.

Each of the contacting portions 24 has an upper small-diameter portion, a middle inclined portion, and a lower large-diameter portion. The upper small-diameter portion guides the resin stopper 11 to be fitted to the top end of the resin shaft 3. An outside face of the middle inclined portion, and an outside face of the lower large-diameter portion are brought into contact with the resin stopper 11.

Figure 4:
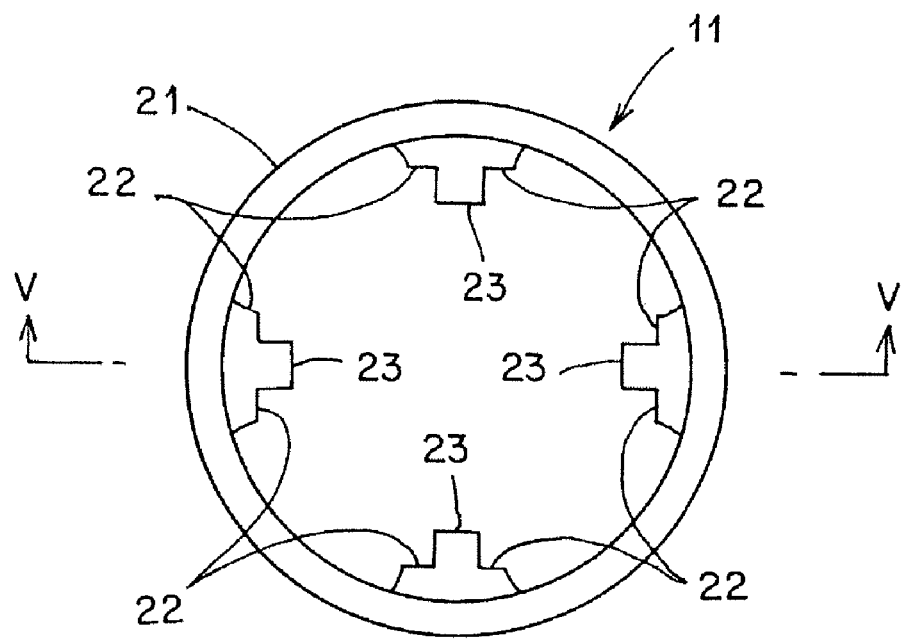
FIG. 4 is a plan view of the stopper.
Figure 5:
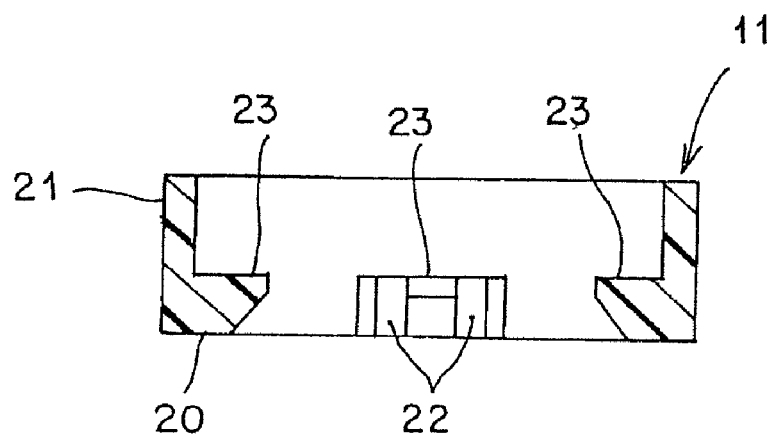
FIG. 5 is a cross-sectional view of the stopper taken along line V-V of FIG. 4.
Figure 6:
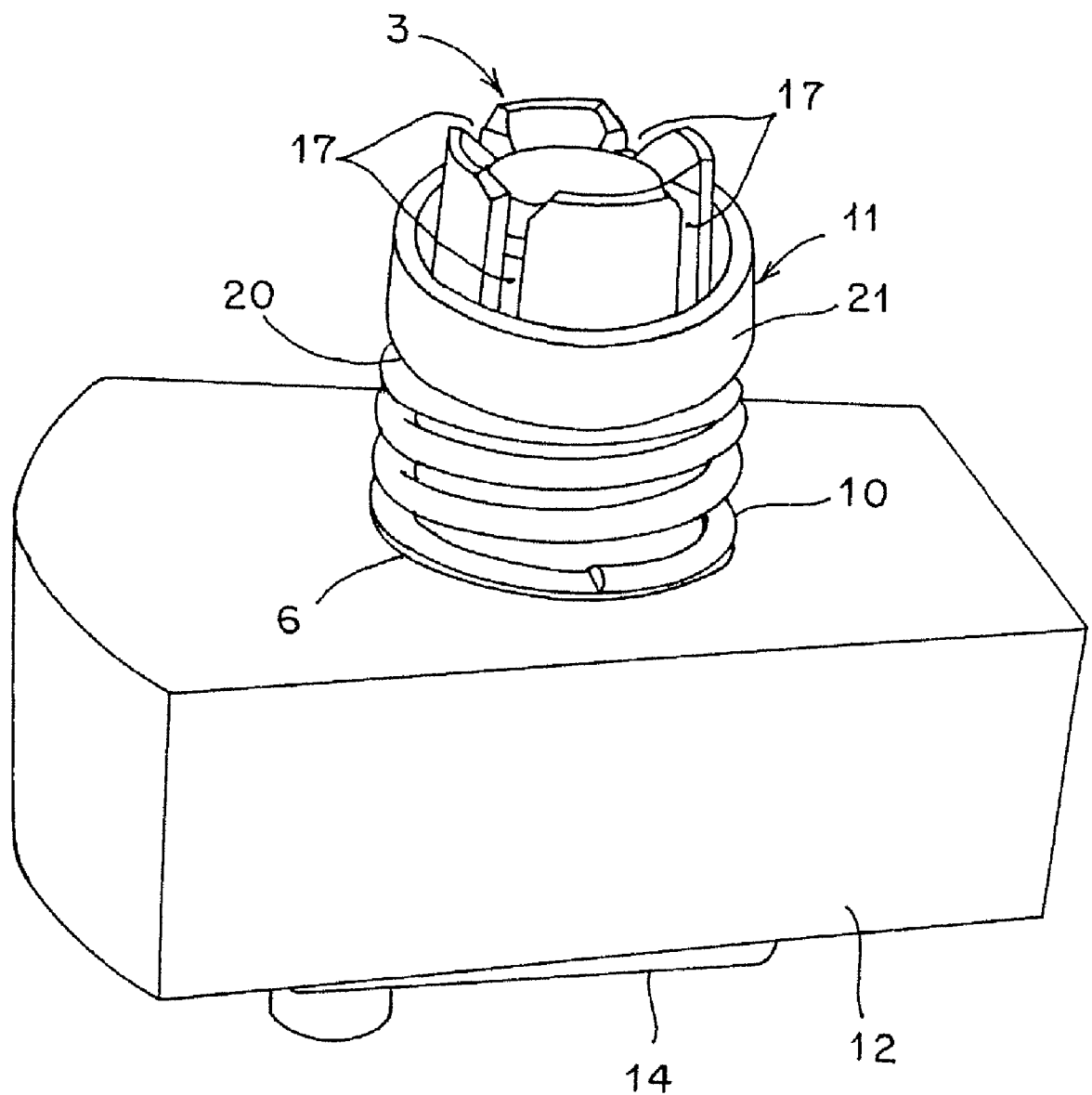
FIG. 6 is a perspective view of the shaft, the attachment member, the washer, the spring, and the stopper all assembled together.

The resin stopper 11 is formed of an elastic resin member as shown in FIGS. 4 and 5. The resin stopper 11 has a ring-shaped main body 21. On one end (bottom end) of the main body 21 is provided a spring contacting portion 20. The spring contacting portion 20 is brought into contact with the spring 10.

The main body 21 has a plurality of engaging nails 23 (four in this embodiment) at equal intervals along one end of an inner peripheral surface thereof. Each of the engaging nails 23 has a top end having a plane face, and a bottom end having an inclined face. The engaging nails 23 are elastically engaged with the engaging portions 18 of the shaft 3. Specifically, top-end plane faces of the engaging nails 23 are elastically engaged with bottom-end plane faces of the engaging portions 18 of the shaft 3.

The engaging nails 23 have side surfaces, an interval of which is equal to or slightly smaller than the width of each groove 17 of the shaft 3. The both side surfaces of each engaging nail 23 are engaged with the engaging portions 19 of the shaft 3.

Figure 9:
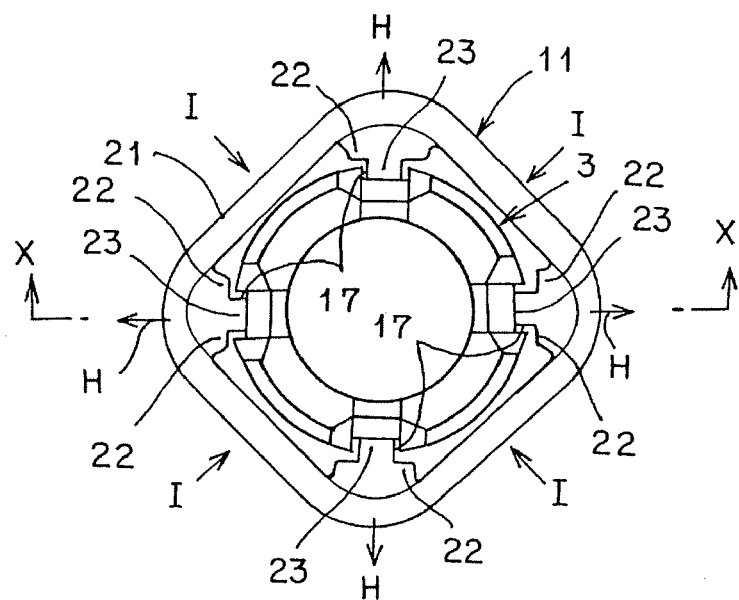
FIG. 9 is a plane view of the stopper being mounted on the shaft with its main body being elastically deformed.
Figure 10:
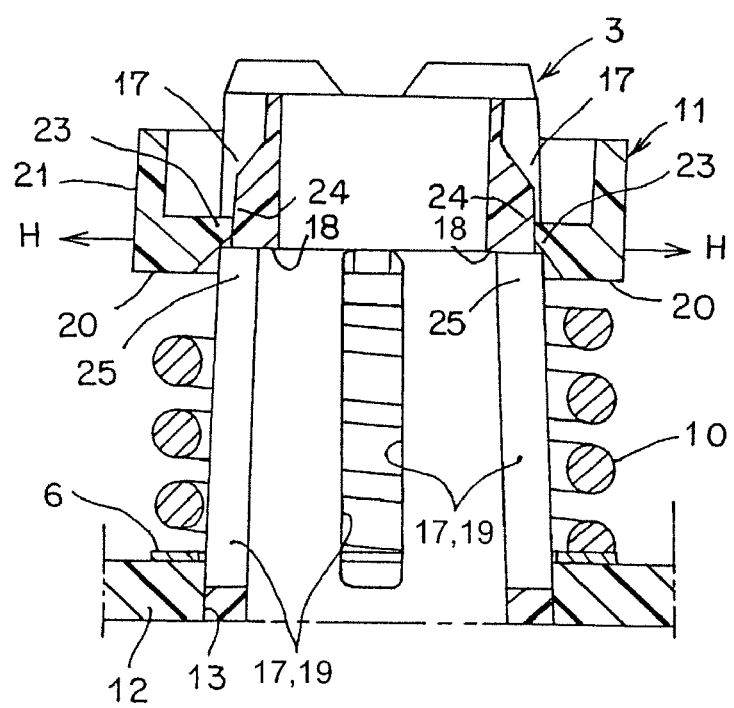
FIG. 10 is a cross-sectional view of the shaft and the stopper taken along line X-X of FIG. 9.

The main body 21 is formed of an elastic member. With this, the main body 21 can be elastically deformed when fitted to the top end (first end) of the shaft 3, and the four engaging nails 23 are brought into contact with the four contacting portions 24 as shown in FIGS. 9 and 10. Specifically, four portions corresponding to the four engaging nails 23 are enlarged outwardly in directions indicated by arrows H. On the contrary, four portions between the four engaging nails 23 are contracted inwardly in directions indicated by arrows I. As a result, the main body 21 is elastically deformed into a square shape (e.g., rhombic shape).

Figure 11:
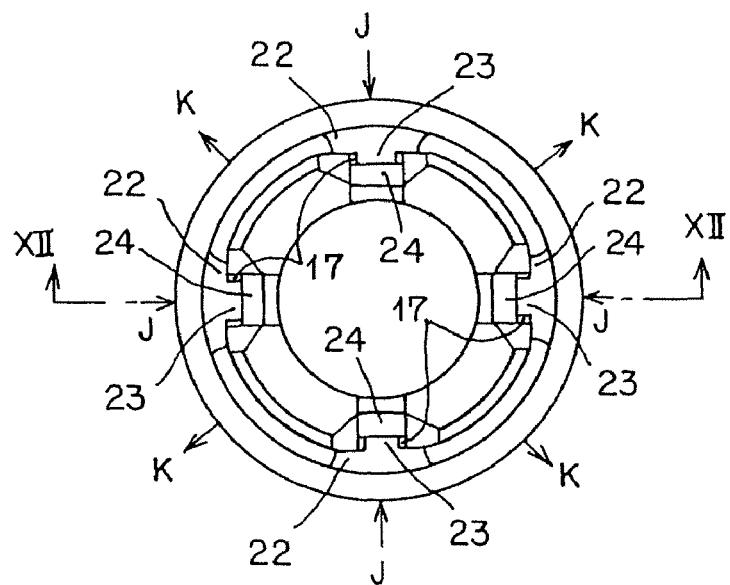
FIG. 11 is a plan view of the stopper mounted on the shaft with engaging nails of the stopper being elastically engaged with engaging portions of the shaft.
Figure 12:
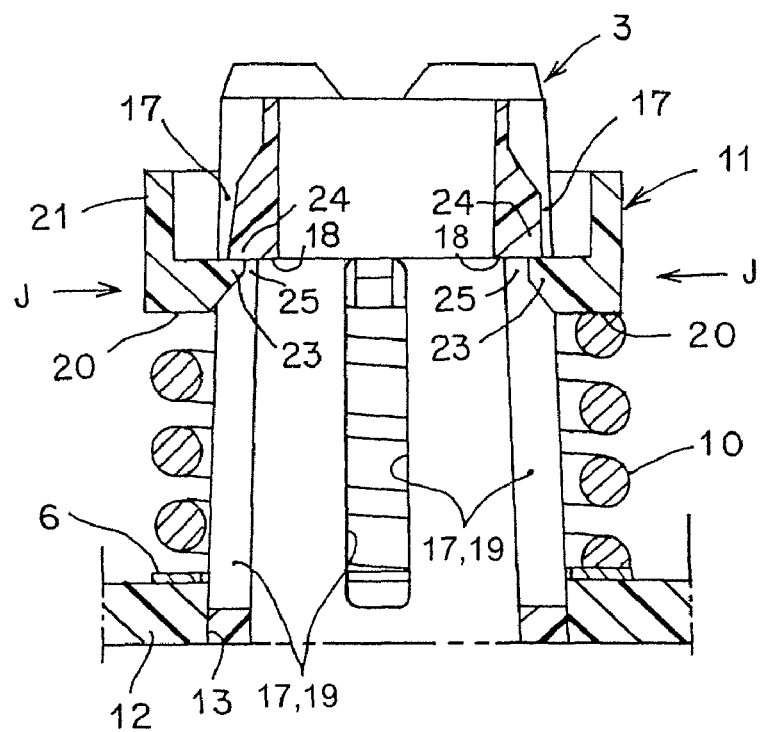
FIG. 12 is a cross-sectional view of the shaft and the stopper taken along line XII-XII of FIG. 11.

As shown in FIGS. 11 and 12, the main body 21 elastically returns to its original shape when the four engaging nails 23 reach the engaging portions 18. Specifically, the four portions corresponding to the four engaging nails 23 are contracted inwardly in directions indicated by arrows J. On the contrary, the four portions between the four engaging nails 23 are enlarged outwardly in directions indicated by arrows K. As a result, the main body 21 elastically returns to its original circular ring shape.

At the base of the main body 21 are provided contact portions 22 on both sides of the four engaging nails 23. When the four engaging nails 23 are elastically engaged with the four engaging portions 18, the contact portions 22 come in contact with the outer peripheral surface of the shaft 3, specifically, the portions between the four grooves 17 on the outer peripheral surface of the shaft 3, in returning directions (indicated by the arrows J).

The spring 10 is formed of a compression spring (compression coil spring). The washer 6 is formed of a normal washer.

The following describes the process of mounting the mirror assembly 4, in an inclinable manner, on the resin shaft 3 via the spring 10, the resin stopper 11, and the washer 6.

Figure 3:
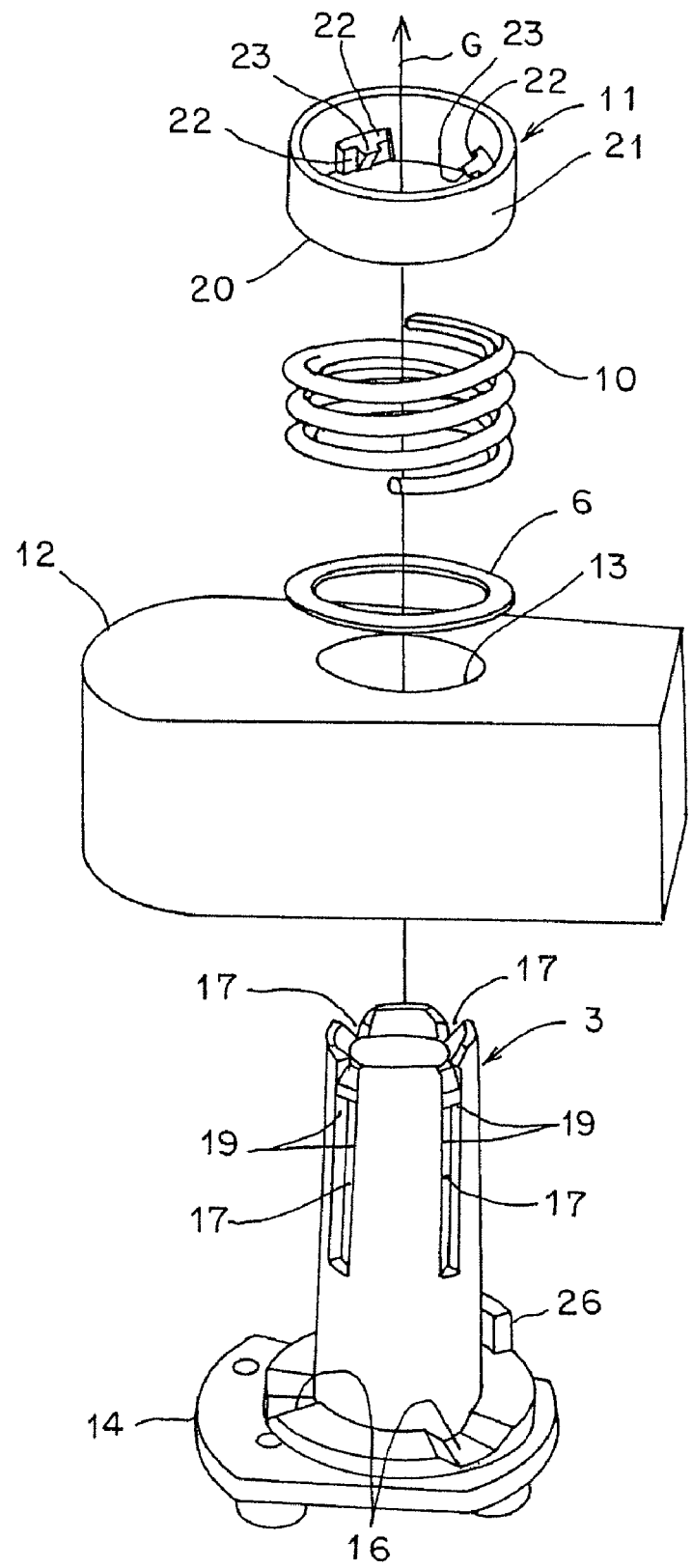
FIG. 3 is an exploded perspective view showing a shaft, an attachment member, a washer, a spring, and a stopper shown in FIG. 2.

The shaft 3 is inserted in the insertion hole 13 of the attachment member 12 of the mirror housing 7 in an arrow G direction shown in FIG. 3 (in a direction from the lower side to the upper side of the mirror housing 7). The lower surface of the attachment member 12 is placed on the upper surface of the shaft holder 14. One of the recessed portions 16 is fitted with the projection in the positioning member. The stopper projection 26 is fitted in the recessed portion or the groove in the stopper.

The washer 6 and the spring 10 are placed onto the shaft 3 one by one in a reverse direction of the arrow G in FIG. 3 (in a direction from the upper side to the lower side of the mirror housing 7). The washer 6 and the spring 10 are placed on the upper surface of the attachment member 12.

Figure 7:
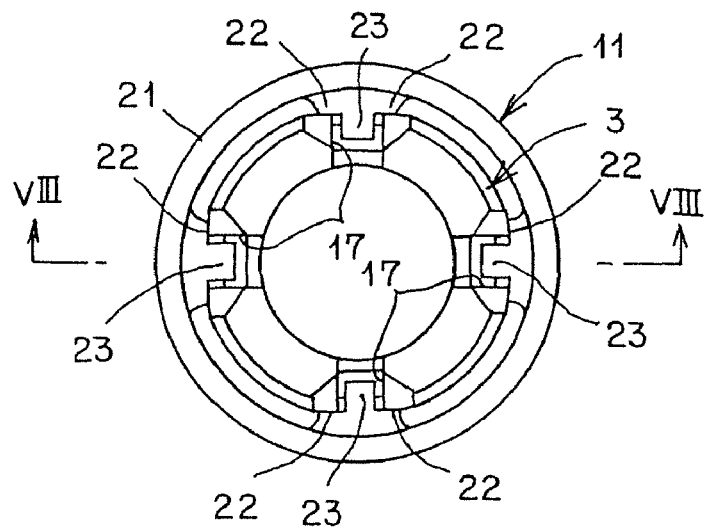
FIG. 7 is a plan view of the stopper stopping at somewhere on the shaft during assembly.
Figure 8:
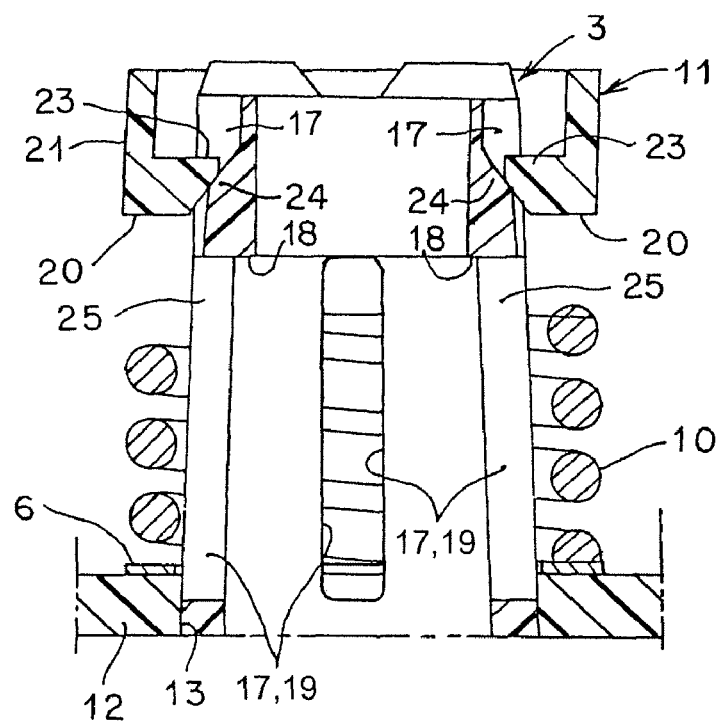
FIG. 8 is a cross-sectional view of the shaft and the stopper taken along line VIII-VIII of FIG. 7.

The four engaging nails 23 of the resin stopper 11 are then fitted in the four grooves 17 of the resin shaft 3, respectively. The stopper 11 is placed onto the shaft 3 in the reverse direction of the arrow G in FIG. 3. Accordingly, tips of the respective four engaging nails 23 of the stopper 11 are brought into contact with the contacting portions 24 at the middle inclined portion in the four grooves 17 of the shaft 3 as shown in FIGS. 7 and 8. Thus, the stopper 11 stops at somewhere on the shaft 3.

The resin stopper 11 is then press-fitted on the resin shaft 3 using a jig (not shown). Accordingly, the four engaging nails 23 in contact with the four contacting portions 24 shifts from the middle inclined portion to the lower large diameter portion as shown in FIGS. 9 and 10. The main body 21 of the resin stopper 11 is thus elastically deformed. Specifically, the four portions corresponding to the four engaging nails 23 are enlarged outwardly in the directions indicated by the arrows H. On the contrary, the four portions between the four engaging nails 23 are contracted inwardly in the directions indicated by the arrows I. As a result, the main body 21 is elastically deformed into a square shape (e.g., rhombic shape).

The stopper 11 is pushed so that the tips of the engaging nails 23 of the stopper 11 reach the engaging portions 18 at the interfaces between the contacting portions 24 and the penetration portions 25 in the grooves 17 of the shaft 3. The main body 21, elastically deformed in a square (rhombic) shape, then elastically returns to its original circular ring shape as shown in FIGS. 11 and 12. Specifically, the four portions corresponding to the four engaging nails 23 are contracted inwardly in the directions indicated by the arrows J. On the contrary, the four portions between the four engaging nails 23 are enlarged outwardly in the directions indicated by the arrows K. Accordingly, the main body 21 elastically returns to its original circular ring shape. At this point, the spring contacting portion 20 of the stopper 11 is in contact with an upper-end surface of the spring 10 with the spring force (reaction force) applied from the spring 10.

Accordingly, the top-end plane faces of the four engaging nails 23 of the stopper 11 are elastically engaged with the bottom-end plane faces of the four engaging portions 18 of the shaft 3 as shown in FIGS. 11 and 12. The four engaging nails 23 of the stopper 11 are elastically engaged with the four engaging portions 18 of the shaft 3. Having been positioned in the four grooves 17 of the shaft 3, the four engaging nails 23 of the stopper 11 are free from contact. This allows the stopper 11 to be free from the force that causes elastic deformation of the main body 21 of the stopper 11 as shown in FIGS. 9 and 10. As a result, the four engaging nails 23 of the stopper 11 are not disengaged from the four engaging portions 18 of the shaft 3 due to the elastic deformation of the main body of the stopper 11 as shown in FIGS. 9 and 10. Thus, the stopper 11 is not disengaged from the shaft 3.

The top-end plane faces of the four engaging nails 23 of the stopper 11 are elastically engaged with the bottom-end plane faces of the four engaging portions 18 of the shaft 3, while the contact portions 22 of the stopper 11 are brought into contact with the outer peripheral surface of the shaft 3 in the elastically returning directions (in the directions indicated by the arrows J), as shown in FIGS. 11 and 12.

The engaging portions 19 on the both side surfaces of the penetration portions 25, provided in the four grooves of the shaft 3, are respectively engaged with the both side surfaces of the four engaging nails 23 of the stopper 11, as shown in FIGS. 11 and 12.

In this way, the resin stopper 11 is fixed to the resin shaft 3 as shown in FIGS. 2, 6, 11, and 12. The spring 10 is placed to surround the resin shaft 3 while compressed between the spring contacting portion 20 of the resin stopper 11 fixed to the resin shaft 3 and the washer 6 on the attachment member 12.

Thus, the mirror assembly 4 is inclinably mounted on the resin shaft 3 via the spring 10, the resin stopper 11, and the washer 6. The shaft holder 14 integrated with the shaft 3 is fixed to the base 2 with the screws 15. In this way, the door mirror 1 of the first embodiment is configured.

With the base 2 fixed to the door D, the door mirror 1 is mounted on the door D. The door mirror 1 includes a fixed portion and an inclinable portion. The fixing portion includes the base 2 fixed to the door D of the vehicle body, the resin shaft 3, and the shaft holder 14. The inclinable portion includes the mirror assembly 4 including the mirror unit 9 and attached to the shaft 3 in an inclinable manner, and the attachment member 12.

The fixed portion (the base 2 fixed to the door D of the vehicle body, the resin shaft 3, and the shaft holder 14) is kept fixed to the vehicle body integrally. On the other hand, the inclinable portion (the mirror assembly 4 including the mirror unit 9 and attached to the shaft 3 in an inclinable manner, and the attachment member 12) is inclined (rotated) about the rotation center O-O of the shaft 3 as cushioning action, when it hits something.

Either of the recessed portions 16 is fitted with the projection in the positioning member, so that the mirror assembly 4 of the inclinable portion is positioned in either the use position A or the retracted position B, with respect to the shaft 3 of the fixed portion. Further, the spring force, i.e., tension, of the spring 10 acts on the recessed portion 16 and the projection fitted therein in the positioning member. In this way, the mirror assembly 4 of the inclinable portion can be held on the shaft 3 of the fixed portion in an inclinable manner with an appropriate holding force. This prevents the recessed portion 16 from releasing the projection in the positioning member due to the wind pressure while the vehicle is running and accordingly the mirror assembly 4 is inclined to the shaft 3, and that the reflecting surface 8 of the mirror unit 9 of the inclinable portion fluctuates while the vehicle is running due to uneven load conditions.

The following describes the operation of the outside mirror apparatus for a vehicle (the door mirror 1) of the first embodiment with the above-described structure.

The mirror assembly 4 of the door mirror 1, provided on the door D with the base 2 fixed thereto, is positioned in the use position A. With the mirror assembly 4 in the use position A, the rear view of the vehicle can be visually checked on the reflecting surface 8 of the mirror unit 9. In this arrangement, the positioning member (the recessed portion 16 for the use position A and the projection) positions the shaft holder 14 of the fixed portion and the attachment member 12 of the inclinable portion in the use position A. Because the spring force (tension) of the spring 10 acts on the positioning member, the mirror assembly 4 is not accidentally inclined to the shaft 3 due to the wind pressure while the vehicle is running, or the reflecting surface 8 of the mirror unit 9 does not accidentally fluctuate while the vehicle is running due to the uneven load conditions.

By driving the remote control unit or the power unit (not shown), the mirror unit 9 can be rotated in the up-and-down direction about the substantially horizontal axis, or in the horizontal direction about the substantially vertical axis. This enables position adjustment of the reflecting surface 8 of the mirror unit 9 to the driver's eye line.

The mirror assembly 4 in the use position A is then manually rotated about the shaft 3 in a clockwise direction with a force greater than the spring force of the spring 10. This releases the recessed portion 16 for the use position A from the projection in the positioning member, allowing the mirror assembly 4 to rotate about the rotation center O-O of the shaft 3 in the clockwise direction. The stopper projection 26 of the stopper is then fitted in the recessed portion or the groove, so that the mirror assembly 4 is guided to rotate.

When the mirror assembly 4 reaches the retracted position B, the recessed portion 16 for the retracted position B and the projection, released from each other, are fitted to each other in the positioning member. In this way, the mirror assembly 4 is retracted to the retracted position B. Accordingly, one edge face of the stopper projection 26 is brought into contact with one edge face of the recessed portion or the groove in the stopper. This restricts the rotation of the mirror assembly 4, thus preventing the mirror assembly 4 from coming into contact with the door D.

The mirror assembly 4 in the retracted position B is manually rotated about the shaft 3 in a counterclockwise direction with a force greater than the spring force of the spring 10. This releases the recessed portion 16 for the retracted position B from the projection in the positioning member, allowing the mirror assembly 4 to rotate about the rotation center O-O of the shaft 3 in the counterclockwise direction. When the mirror assembly 4 reaches the use position A, the recessed portion 16 for the use position A and the projection, released from each other, are fitted again in the positioning member. In this way, the mirror assembly 4 is positioned in the use position A.

On the contrary, the mirror assembly 4 in the use position A is manually rotated about the shaft 3 in the counterclockwise direction with a force greater than the spring force of the spring 10. This releases the recessed portion 16 for the use position A from the projection in the positioning member, allowing the mirror assembly 4 to rotate about the rotation center O-O of the shaft 3 in the counterclockwise direction. The stopper projection 26 is then fitted in the recessed portion or the groove in the stopper, so that the mirror assembly 4 is guided to rotate.

When the mirror assembly 4 reaches the forward-inclined position C, the other edge face of the stopper projection 26 is brought into contact with the other edge face of the recessed portion or groove in the stopper. This restricts the rotation of the mirror assembly 4, causing the mirror assembly 4 to be positioned in the forward-inclined position C. As a result, the mirror assembly 4 is prevented from coming into contact with the door D.

The mirror assembly 4 in the forward-inclined position C is manually rotated about the shaft 3 in the clockwise direction with a force greater than the spring force of the spring 10. This allows the mirror assembly 4 to rotate about the rotation center O-O of the shaft 3 in the clockwise direction. When the mirror assembly 4 reaches the use position A, the recessed portion 16 for the use position A and the projection, released from each other, are fitted again in the positioning member. In this way, the mirror assembly 4 is positioned in the use position A.

Such force greater than the spring force of the spring 10 acts on the mirror assembly 4 in the use position A. Thus, in a similar manner as rotated manually, the mirror assembly 4 is rotated about the rotation center O-O of the shaft 3 in the clockwise or the counterclockwise direction as cushioning action.

With this structure of the door mirror 1 according to the first embodiment, when the shaft 3 is inserted in the ring-shaped main body 21 and the resin stopper 11 is mounted on the resin shaft 3, specifically, when the four engaging nails 23 of the stopper 11 are elastically engaged with the four engaging portions 18 of the shaft 3, respectively, the four engaging nails 23 are brought into contact with the four contacting portions 24 of the shaft 3, respectively. As a result, the entire main body 21 of the stopper 11 is elastically deformed as shown in FIGS. 9 and 10. The force causing the elastic deformation of the stopper 11 is not concentrated on the engaging nails 23, but is distributed to the entire main body 21, this prevents deformation of the engaging nails 23. Thus, it is possible to prevent deformation of the engaging nails 23, differently from a conventional outside mirror apparatus for a vehicle using a metal spring stopper, not a resin spring stopper, in which the force for mounting a resin string stopper on a resin shaft is concentrated on nails of the resin spring stopper, possibly causing deformation of the nails.

As described above, according to the first embodiment, the door mirror 1 can use the resin stopper 11 as a stopper. In conventional door mirrors, because a metal stopper having a hardness greater than that of a resin shaft is used, the resin shaft may be scraped (as a soft material is scraped by a hard material). In contrast, the door mirror 1 of the first embodiment uses a resin stopper having a hardness equal to or lower than that of the resin shaft. This reliably prevents the resin shaft 3 from being scraped by the four engaging nails 23 of the resin stopper 11.

Besides, the four engaging nails 23 of the stopper 11 are elastically engaged with the four engaging portions 18 of the shaft 3, respectively. As described, the force causing elastic deformation of the main body 21 of the stopper 11 as shown in FIGS. 9 and 10 does not act on the stopper 11. This prevents the four engaging nails 23 of the stopper 11 from being disengaged from the four engaging portions 18 of the shaft 3. Thus, the stopper 11 does not come off from the shaft 3.

Moreover, when the four engaging nails 23 of the resin stopper 11 are elastically engaged with the four engaging portions 18 of the resin shaft 3, the contact portions 22 of the stopper 11 are brought into contact with the outer peripheral surface of the shaft 3 in the directions J in which the main body 21 of the stopper 11 is elastically deformed. With this arrangement, after the engaging nails 23 of the stopper 11 are elastically engaged with the engaging portions 18 of the shaft 3, the stopper 11 is not shifted in a radial direction of the shaft 3, and accordingly, the engaging nails 23 of the stopper 11 are not disengaged from the engaging portions 18 of the shaft 3. This reliably prevents the stopper 11 from coming off from the shaft 3.

Furthermore, the engaging portions 19 of the shaft 3 are engaged with portions between the engaging nails 23 of the stopper 11 on the surface of the shaft as shown in FIGS. 11 and 12. With this arrangement, both the resin shaft 3 and the resin stopper 11 are reliably prevented from rotating in the circumference direction of the shaft 3, when the resin stopper 11 is mounted on the resin shaft 3 and then the mirror assembly 4 is inclined to the shaft 3. Further, both the resin shaft 3 and the resin stopper 11 are reliably prevented from rotating in the circumference direction of the shaft 3 and causing friction between the four engaging nails 23 of the resin stopper 11 and the engaging portions 18 of the resin shaft 3, when the resin stopper 11 is mounted on the resin shaft 3 and then the mirror assembly 4 is inclined to the shaft 3.

Figure 13:
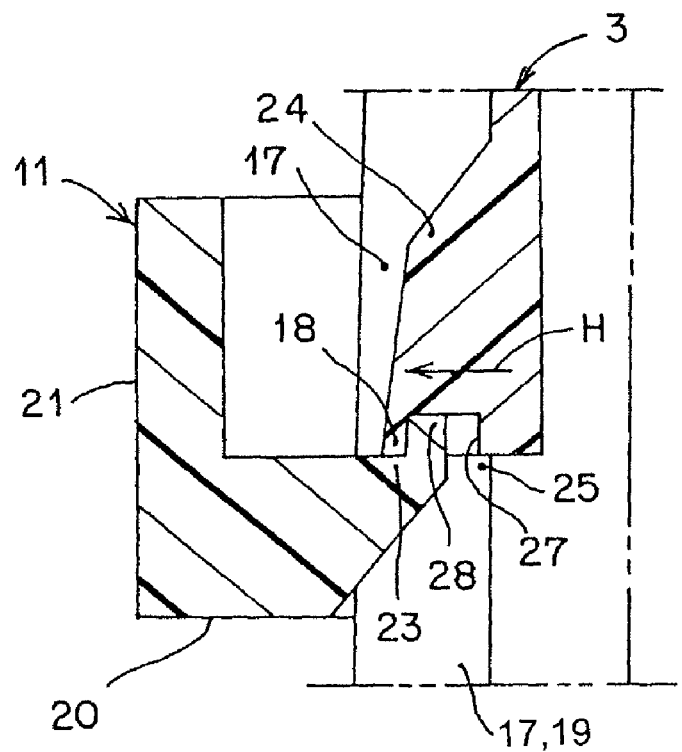
FIG. 13 is a partially enlarged sectional view of relevant portions of an outside mirror apparatus for a vehicle according to a second embodiment of the present invention.
Figure 14:
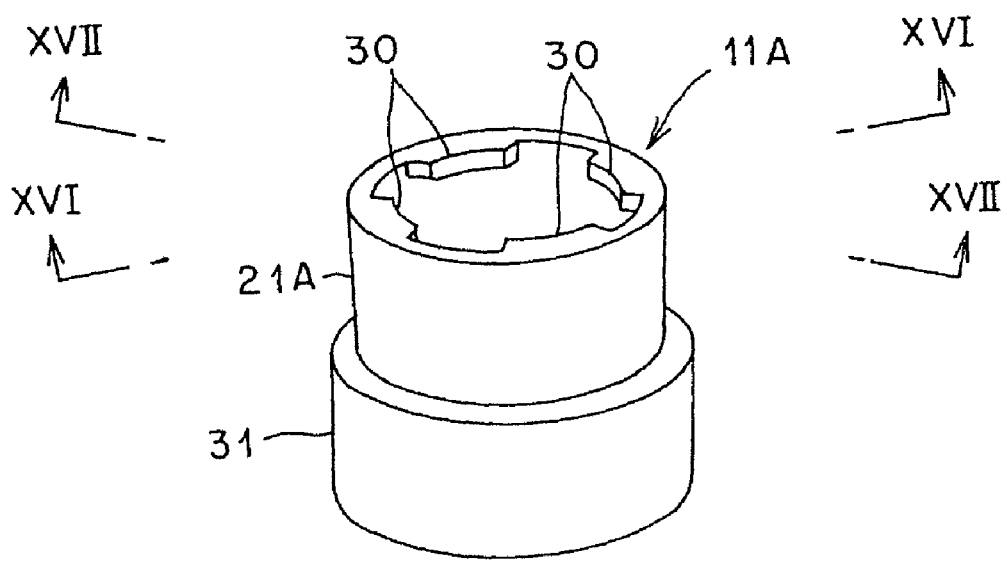
FIG. 14 is a perspective view of a stopper of an outside mirror apparatus for a vehicle according to a third embodiment of the present invention.

FIG. 13 is a schematic diagram of an outside mirror apparatus for a vehicle according to a second embodiment of the present invention. In FIG. 13, like reference numerals refer to portions corresponding to those in FIGS. 1 to 12.

The following describes the outside mirror apparatus for a vehicle according to the second embodiment. According to the second embodiment, the outside mirror apparatus for a vehicle (door mirror) includes retaining members provided on the four engaging portions 18 of the resin shaft 3 and the four engaging nails 23 of the resin stopper 11.

The retaining members include external walls of recessed portions 27 provided on the respective bottom-end faces of the four engaging portions 18, and outside faces of projections 28 provided on the respective top-end faces of the four engaging nails 23. Alternatively, projections may be provided on the respective bottom-end faces of the engaging portions 18, and recessed portions may be provided on the respective top-end faces of the engaging nails 23.

The top-end plane faces of the four engaging nails 23 of the resin stopper 11 are elastically engaged with the bottom-end plane faces of the four engaging portions 18 of the resin shaft 3, respectively. Concurrently, the outside faces of the projections 28 provided on the four engaging nails 23 of the stopper 11, respectively hit the external walls of the recessed portions 27 provided in the four engaging portions 18 of the shaft 3, in the elastic deformation directions (in the directions indicated by the arrows H).

As a result, according to the second embodiment, when the four engaging nails 23 of the resin stopper 11 are elastically engaged with the four engaging portions 18 of the resin shaft 3, the outside faces of the projections 28, which serve as the retaining members on the engaging nails 23 of the stopper 11, respectively hit the external walls of the recessed portions 27, which serve as the retaining members on the engaging portions 18 of the shaft 3, in the elastic deformation directions (in the directions indicated by the arrows H). This reliably prevents the stopper 11 from coming off from the shaft 3 due to the elastic deformation of the main body 21 of the stopper 11 as shown in FIGS. 9 and 10. Specifically, after the four engaging nails 23 of the resin stopper 11 are elastically engaged with the four engaging portions 18 of the resin shaft 3, the force causing the elastic deformation of the main body 21 of the stopper 11 does not act on the main body 21 of the stopper 11. This prevents the stopper 11 from coming off from the shaft 3 due to the elastic deformation of the main body 21 of the stopper 11. For example, assume that the four engaging nails 23 of the stopper 11 are enlarged outwardly in the direction indicated by the arrows H to cause elastic deformation of the main body 21 of the stopper 11 as shown in FIGS. 9 and 10. In this case, the outside faces of the projections 28, which serve as the retaining members on the engaging nails 23 of the stopper 11, respectively hit the external walls of the recessed portions 27, which serve as the retaining members on the engaging portions 18 of the shaft 3, in the elastic deformation directions (in the directions indicated by the arrows H). As a result, the four engaging nails 23 of the stopper 11 are not enlarged outwardly in the directions indicated by the arrows H, and accordingly the main body 21 of the stopper 11 is not elastically deformed as shown in FIGS. 9 and 10. Thus, it is possible to reliably prevent the stopper 11 from coming off from the shaft 3.

FIGS. 14 to 18 are schematic diagrams of an outside mirror apparatus for a vehicle according to a third embodiment of the present invention. In FIGS. 14 to 18, like reference numerals refer to portions corresponding to those in FIGS. 1 to 13.

The following describes the outside mirror apparatus for a vehicle according to the third embodiment. In the outside mirror apparatus for a vehicle (door mirror) according to the third embodiment, a cylindrical main body 21A of a resin stopper 11A has a height larger than that of the main body 21 of the stopper 11 according to the first and second embodiments. Specifically, the main body 21A of the stopper 11A has a height that is equal to a height up to the first end (top end)

of the shaft 3 relative to the engaging portions 18 of the shaft 3, which are elastically engaged with the engaging nails 23 of the stopper 11A.

Along one end (top end) of an inner peripheral surface of the main body 21A of the stopper 11A are integrally provided a plurality of retainers 30 (four in this embodiment). The four retainers 30 are in contact with the outer peripheral surface of the first end (top end) of the shaft 3 in the radial direction of the shaft 3 to suppress undesirable movement of the stopper 11A. The four retainers 30 and the four engaging nails 23 are alternately provided in the circumference direction on the cylindrical stopper 11A.

In the stopper 11A, a cylindrical cover 31 is integrally provided on one end (bottom end) of the main body 21A to cover the entire spring 10. The cover 31 of the stopper 11A has a height approximately equal to a space T1 that is created between a bottom-end surface of the cover 31 and the upper surface of the attachment member 12 when the engaging nails 23 of the stopper 11A are elastically engaged with the engaging portions 18 of the shaft 3.

Figure 15:
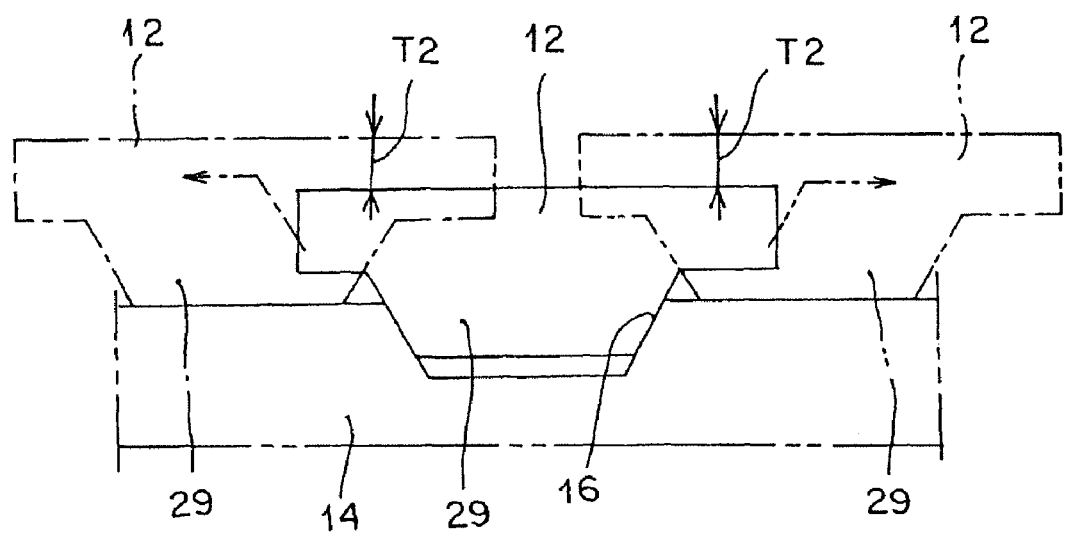
FIG. 15 is a schematic diagram for explaining an operational state of a positioning member of the outside mirror apparatus for a vehicle according to the third embodiment.
Figure 16:
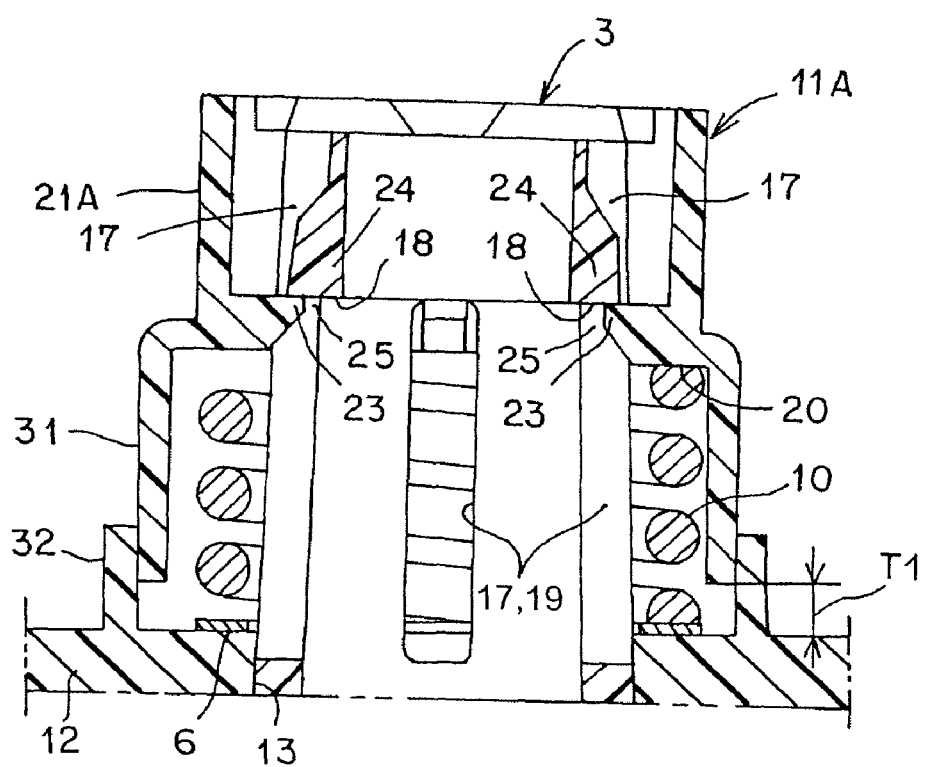
FIG. 16 is a cross-sectional view of the stopper taken along line XVI-XVI of FIG. 14.
Figure 17:
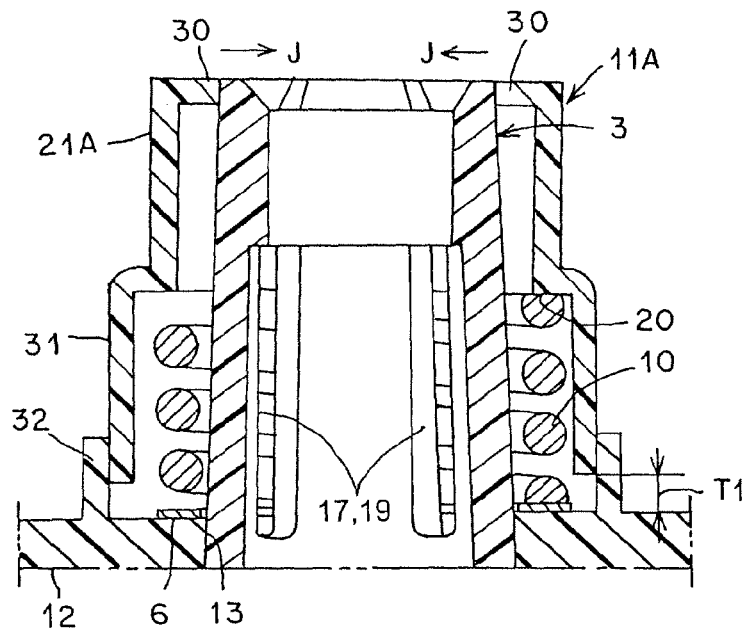
FIG. 17 is a cross-sectional view of the stopper taken along line XVII-XVII of FIG. 14.
Figure 18:
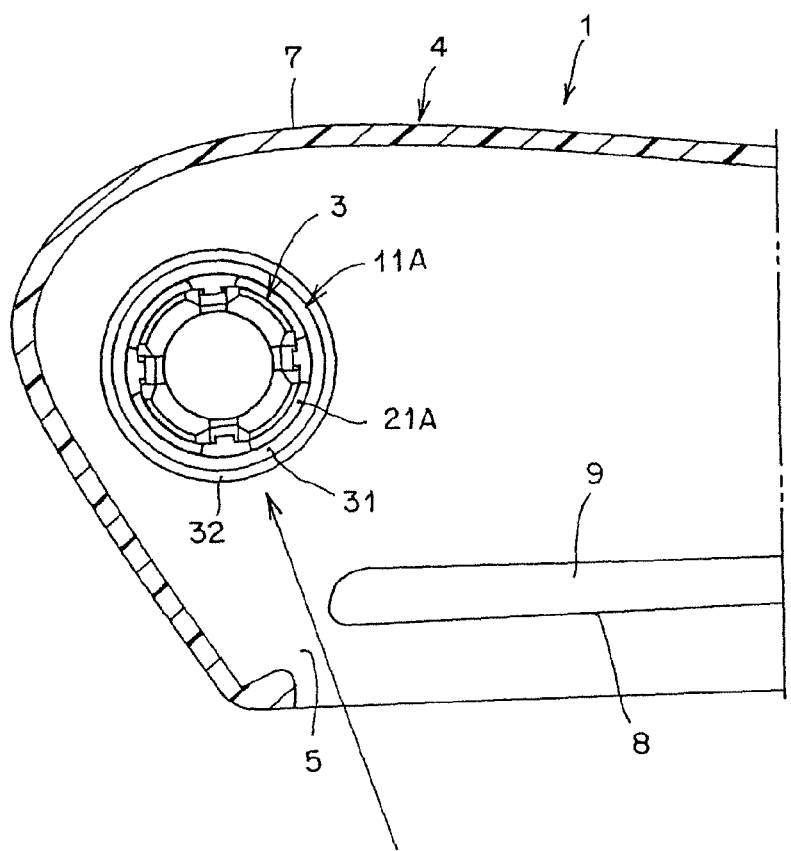
FIG. 18 is a partial horizontal sectional view of a spring covered by a cover of the stopper shown in FIG. 14.

When the mirror assembly 4 in the use position A or the retracted position B is rotated about the rotation center O-O of the shaft 3, a projection 29 serving as the positioning member on the attachment member 12 of the inclinable portion is jumped from the recessed portion 16 serving as the positioning member on the shaft holder 14 of the fixed portion, as shown in FIG. 15. Accordingly, the recessed portion 16 is released from the projection 29 in the positioning member. When the projection 29 is jumped from the recessed portion 16 and moved from a position indicated by a solid line to a position indicated by a chain line or a chain double-dashed line, the attachment member 12 is elevated by a distance of T2. The space T1 between the cover 31 and the attachment member 12 is equal to or slightly larger than T2, which is the elevated distance of the attachment member 12.

On a portion (lower portion) of the cover 31 of the stopper 11A, opposite the main body 21A, and on the attachment member 12 of the mirror assembly 4 are respectively provided retainers in contact with each other in the radial direction of the shaft 3 to retain the shaft 3. The retainers include a lower outside surface of the cover 31, and an inside surface of a cylindrical portion 32 integrally provided on the upper surface of the attachment member 12. An external diameter of the lower portion of the cover 31 is equal to or slightly larger than an internal diameter of the cylindrical portion 32.

With this structure of the outside mirror apparatus for a vehicle (door mirror) according to the third embodiment, when the four engaging nails 23 of the resin stopper 11A are elastically engaged with the four engaging portions 18 of the resin shaft 3, the retainers 30 of the stopper 11A hit the outer peripheral surface on the top end of the shaft 3, in the radial direction thereof, i.e., in the directions J in which the stopper 11A elastically returns. The cover 31 of the stopper 11A entirely covers the spring 10. Specifically, the main body 21A and the cover 31 of the stopper 11A cover the shaft 3 and the spring 10 entirely. Further, the lower outside surface of the cover 31 of the stopper 11A and the inside surface of the cylindrical portion 32 of the attachment member 12 are in contact with each other in the radial direction of the shaft 3.

When the four engaging nails 23 of the resin stopper 11A are elastically engaged with the four engaging portions 18 of the resin shaft 3, the four retainers 30 of the stopper 11A hit the outer peripheral surface on the top end of the shaft 3 in the radial direction thereof, i.e., in the directions J in which the stopper 11A elastically returns. This allows the stopper 11A to be fixed to the shaft 3 without being deflected in the radial direction thereof, thus allowing the spring 10 to be compressed stably by the stabilized stopper 11A. As a result, the mirror assembly 4 can be inclinably mounted on the shaft 3 stably, preventing undesirable movement of the reflecting surface 8 of the mirror unit 9 of the mirror assembly 4.

The four retainers 30 and the four engaging nails 23 of the stopper 11A are alternately provided on the circumference direction of the cylindrical stopper 11A. Thus, when the four engaging nails 23 are elastically engaged with the four engaging portions 18 provided on the portions corresponding to the four grooves 17 of the shaft 3, the four retainers 30 face portions other than the four grooves 17 on the shaft 3, respectively. As a result, the four retainers 30 neither face the four grooves 17 on the shaft 3, nor fail to hit the outer peripheral surface on the top end of the shaft 3. Thus, the four retainers 30 reliably hit the outer peripheral surface on the top end of the shaft 3.

Further, the four retainers 30 are provided on the cylindrical main body 21A of the resin stopper 11A. This prevents the retainers 30 from being in a circular ring or flange shape. Specifically, a space is provided between the four retainers 30 in the circumference direction. This arrangement does not prevent the main body 21A of the stopper 11A from being elastically deformed as shown in FIGS. 9 and 10. For example, assume that each of the retainers is in a circular ring or flange shape. In this case, the main body 21A of the stopper 11A is prevented from being elastically deformed as shown in FIGS. 9 and 10. In contrast, in the outside mirror apparatus for a vehicle (door mirror) of the third embodiment, because the retainers 30 are not in a circular ring or flange shape, the main body 21 of the stopper 11A is not prevented from being elastically deformed as shown in FIGS. 9 and 10.

The spring 10 is entirely covered by the cover 31 of the resin stopper 11A. This improves aesthetic appearance of the mirror assembly 4 even when the inside thereof is seen through a space between the mirror housing 7 and the mirror unit 9 in the opening 5 of the mirror housing 7 as indicated by a solid arrow in FIG. 18, because the spring 10 is entirely covered by the stopper 11A. The spring 10 is noticeable because it is formed of an elastic metal member, and is plated or evaporated with aluminum. Therefore, aesthetic appearance through the space between the mirror housing 7 and the mirror unit 9 in the opening 5 is a challenge for the mirror assembly 4.

When the four engaging nails 23 of the resin stopper 11A are elastically engaged with the four engaging portions 18 of the resin shaft 3, the lower outside surface of the cover 31, which serves as the retainer on the stopper 11A, and the inside surface of the cylindrical portion 32, which serves as the retainer on the attachment member 12, are in contact with each other in the radial direction of the shaft 3. This allows the stopper 11A to be fixed to the mirror assembly 4 without being deflected in the radial direction of the shaft 3, thus allowing the spring 10 to be compressed stably by the stabilized stopper 11A. As a result, the mirror assembly 4 can be inclinably mounted on the shaft 3 stably, which prevents undesirable movement of the reflecting surface 8 of the mirror unit 9 in the mirror assembly 4.

The space T1 between the cover 31 and the attachment member 12 is equal to or slightly larger than the elevated distance T2 of the attachment member 12 when the recessed portion 16 is released from the projection 29 in the positioning member. With this arrangement, when the recessed portion 16 is released from the projection 29 in the positioning member and the attachment member 12 is elevated accordingly, the lower surface of the cover 31 is not brought into contact with the upper surface of the attachment member 12. Thus, the elevation of the attachment member 12 is not prevented.

Figure 19:
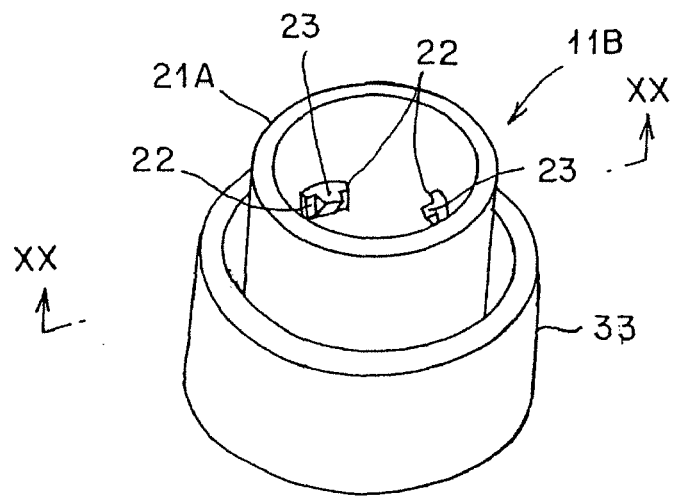
FIG. 19 is a perspective view of a stopper of an outside mirror apparatus for a vehicle according to a fourth embodiment of the present invention.
Figure 20:
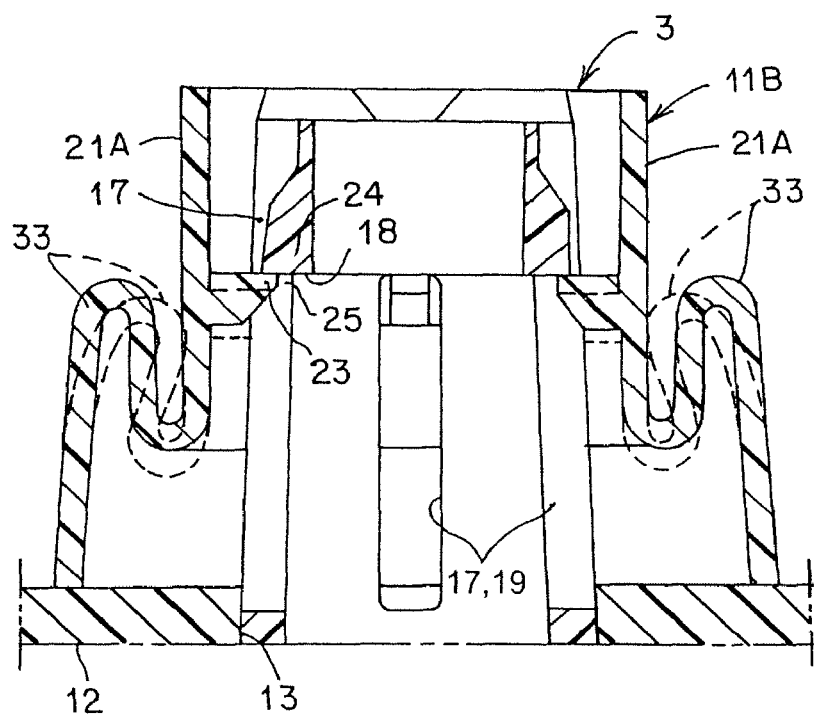
FIG. 20 is a cross-sectional view of the stopper taken along line XX-XX of FIG. 19.

FIGS. 19 and 20 are schematic diagrams of an outside mirror apparatus for a vehicle according to a fourth embodiment of the present invention. In FIGS. 19 and 20, like reference numerals refer to portions corresponding to those in FIGS. 1 to 18.

The following describes the outside mirror apparatus for a vehicle according to the fourth embodiment. In the outside mirror apparatus for a vehicle (door mirror) according to the fourth embodiment, the main body 21A of a resin stopper 11B is integrally provided with a spring 33. Specifically, the resin spring 33 is integrally provided on a bottom end of the main body 21A of the stopper 11B. The spring 33 has a cylindrical shape, and a cross portion defined by a continuous U-shaped and inverted U-shaped line.

With this structure of the outside mirror apparatus for a vehicle (door mirror) according to the fourth embodiment, when the four engaging nails 23 of the resin stopper 11B are elastically engaged with the four engaging portions 18 of the resin shaft 3, the lower end of the spring 33, integrally provided on the main body 21A of the stopper 11B, is elastically brought into contact with the upper surface of the attachment member 12. Accordingly, the spring 33 integrally provided on the stopper 11B operates in a similar manner as the compression spring (compression coil spring) 10, which is provided separately from the stopper 11B. Thus, even when the compression spring (compression coil spring) 10 provided separately from the stopper 11B is omitted, the spring 33 integrally provided on the main body 21A of the stopper 11B can serve as an alternative of the separately provided spring 10. This reduces the number of components, and the man-hour required for manufacturing and assembly, thus achieving low cost.

Figure 21:
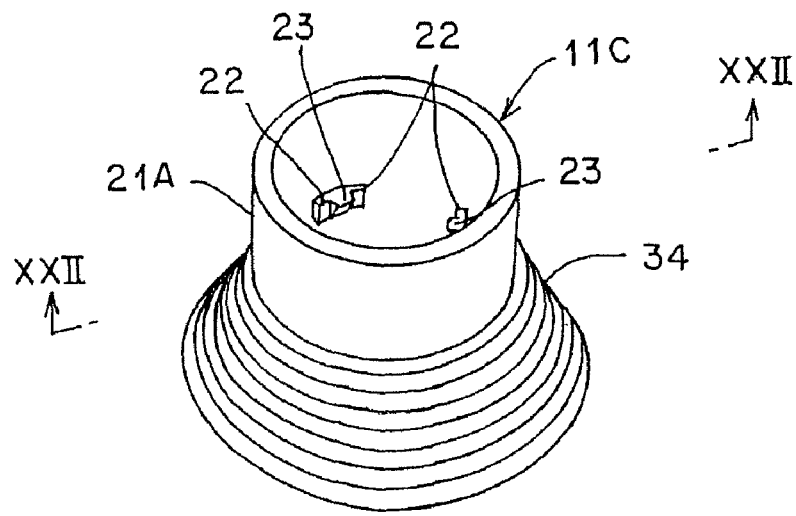
FIG. 21 is a perspective view of a stopper of an outside mirror apparatus for a vehicle according to a fifth embodiment of the present invention.
Figure 22:
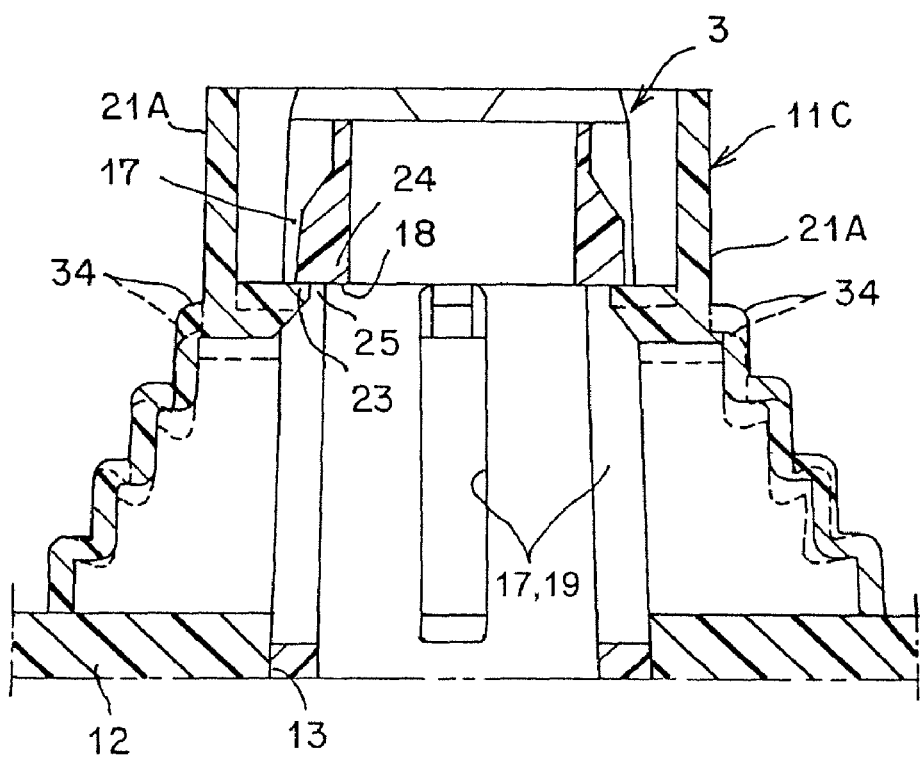
FIG. 22 is a cross-sectional view of the stopper taken along line XXII-XXII of FIG. 21.

FIGS. 21 and 22 are schematic diagrams of an outside mirror apparatus for a vehicle according to a fifth embodiment of the present invention. In FIGS. 21 and 22, like reference numerals refer to portions corresponding to those in FIGS. 1 to 20.

The following describes the outside mirror apparatus for a vehicle according to the fifth embodiment. As in the outside mirror apparatus for a vehicle (door mirror) of the fourth embodiment, the main body 21A of a resin stopper 11C is integrally provided with a spring 34 in the outside mirror apparatus for a vehicle (door mirror) of the fifth embodiment. Specifically, the resin spring 34 is integrally provided on a bottom end of the main body 21A of the stopper 11C. The spring 34 includes a plurality of cylindrical portions (four in this embodiment) having diameters that are gradually increased from the top to the bottom, and a plurality of circular plates (four in this embodiment) having sizes that are gradually increased from the top to the bottom. The cylindrical portions and the circular plates are alternately provided in series.

With this structure of the outside mirror apparatus for a vehicle (door mirror) according to the fifth embodiment, when the four engaging nails 23 of the resin stopper 11C are elastically engaged with the four engaging portions 18 of the shaft 3, the lower end of the spring 34, integrally provided on the main body 21A of the stopper 11C, is elastically brought into contact with the upper surface of the attachment member 12. Accordingly, the spring 34 integrally provided on the stopper 11C operates in a similar manner as the compression spring (compression coil spring) 10, which is provided separately from the stopper 11C. Thus, even when the compression spring (compression coil spring) 10 provided separately from the stopper 11C is omitted, the spring 34 integrally provided on the main body 21A of the stopper 11C can serve as an alternative of the separately provided spring 10. This reduces the number of components, and the man-hour required for manufacturing and assembly, thus achieving low cost.

While the first to the fifth embodiments are described as being applied to the door mirror 1 mounted on the door D of a passenger automobile, they can be applied to other mirrors such as a fender mirror mounted on a fender of a passenger automobile, or a truck mirror mounted on a fender or pillar of a truck. Specifically, the foregoing embodiments can be applied to an outside mirror apparatus for a vehicle that has a fixed portion including a base fitted to a vehicle body and a resin shaft, and an inclinable portion including a mirror unit (mirror) and a mirror assembly that are attached to the shaft in an inclinable manner.

In the first to the fifth embodiments, the mirror assembly 4 is manually inclined (rotated) about the shaft 3 between the use position A and the retracted position B. The mirror assembly, however, can be motor-driven by a motor housing including a motor and a torque transmission mechanism (a speed reduction mechanism and a clutch mechanism) to be inclined with respect to a shaft between a use position and a retracted position. In this case, a casing of the motor housing (e.g., a casing including a gear case and a cover) serves as an attachment member provided separately from a mirror housing.

In the first to the fifth embodiments, the mirror housing 7 is formed of a single component. The mirror housing, however, can have a plurality of components that are separately provided, including a main body and covers (dressing cover, garnish, and shell frame) for covering the main body.

In the first to the fifth embodiments, the positioning member includes the notch-like recessed portions and projections, i.e., the recessed portions and the projections each having a trapezoidal cross portion. The positioning member, however, can include: a ball and a concave portion receiving the ball; hemispherical concave and convex portions; concave and convex portions each having a semicircular cross portion; or recessed portions and projections each having a triangle cross portion.

In the first to the fifth embodiments, the contact portions 22, the engaging nails 23, and the retainers 30 are each described as being four in number by way of example. However, the number of contact portions, engaging nails, and retainers can be three, five, or more depending on the size of the product or the load of the spring.

In the first to the fifth embodiments, the attachment member 12, including a frame and a bracket provided separately from the mirror housing 7, is fixed to the mirror housing 7 integrally. The attachment member, however, can be integrally provided with a mirror housing.

While, in the first to the fifth embodiments, the stopper has the circular ring main body, it can have a main body of a ring shape other than a circular ring shape. The main body needs to be formed of an elastic member that is elastically deformed when engaging nails of a stopper are brought into contact with contacting portions of a shaft, and that elastically returns to its original shape when the engaging nails of the stopper reach engaging portions of the shaft.

In the third embodiment, the cylindrical cover 31 for covering the entire spring 10 is provided to extend from one end (top end) of the main body 21A of the stopper 11A. The cover, however, can have a shape of a half cylinder covering part of a spring, or a shape of part of a cylinder.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

This application claims priority from Japanese Patent Application No. 2007-251171, filed Sep. 27, 2007, which is incorporated herein by reference in its entirety.

What is claimed is:

1. An outside mirror apparatus for a vehicle including a mirror assembly that is inclinable with respect to a vehicle body, the outside mirror apparatus comprising:
    a base that is fixed to the vehicle body;
    a shaft that is made of resin and fixed to the base;
    a stopper that is made of resin and fixed to the shaft;
    a spring that is arranged around the shaft while compressed by the stopper; and
    the mirror assembly that is inclinably mounted on the shaft via the spring and the stopper, wherein
    the shaft includes
        a contacting portion on one end having an engaging portion on an opposite side of the one end of the shaft,
    the stopper includes
        a ring-shaped main body having a first end from which the shaft is inserted;
        a spring contacting portion located on the first end of the main body and brought into contact with the spring; and
        a plurality of engaging nails arranged along an inner peripheral surface of the first end of the main body and elastically engaged with the engaging portion, and
    the main body is formed of such an elastic member that is elastically enlarged outwardly at portions corresponding to respective engaging nails and contracted inwardly at respective portions between adjacent engaging nails when the shaft is inserted in the main body from the first end and each of the engaging nails is brought into contact with the contacting portion, and that elastically returns to an original shape when each of the engaging nails reaches the engaging portion.

2. The outside mirror apparatus for a vehicle according to claim 1, wherein the stopper includes a contact portion that is brought into contact with, when each of the engaging nails is elastically engaged with the engaging portion, the shaft in a direction in which the main body elastically returns.

3. The outside mirror apparatus for a vehicle according to claim 1, wherein the engaging portion of the shaft and the engaging nails of the stopper include a retaining member that prevents the stopper from coming off from the shaft due to elastic deformation of the main body.

4. The outside mirror apparatus for a vehicle according to claim 1, wherein the stopper includes a plurality of retainers arranged along an inner peripheral surface of a second end of the main body and brought into contact with an outer peripheral surface of one end of the shaft in a radial direction of the shaft to retain the shaft.

5. The outside mirror apparatus for a vehicle according to claim 1, wherein a cover that covers at least part of the spring extends from the first end of the main body of the stopper.

6. The outside mirror apparatus for a vehicle according to claim 5, wherein a portion of the cover on an opposite side of the main body and the mirror assembly include retainers in contact with each other in a radial direction of the shaft to retain the shaft.

7. The outside mirror apparatus for a vehicle according to claim 1, wherein the main body of the stopper is integrated with the spring.

* * * * *